US006467021B1

(12) United States Patent
Sinclair (10) Patent No.: US 6,467,021 B1
(45) Date of Patent: Oct. 15, 2002

(54) DATA STORAGE SYSTEM STORING DATA OF VARYING BLOCK SIZE

(75) Inventor: Alan Welsh Sinclair, Edinburgh (GB)

(73) Assignee: Memquest, Inc., Wilmington, DE (US)

( * ) Notice: Subject to any disclaimer, the term of this patent is extended or adjusted under 35 U.S.C. 154(b) by 0 days.

(21) Appl. No.: 09/164,344

(22) Filed: Oct. 1, 1998

Related U.S. Application Data (63) Continuation of application No. PCT/GB97/00935, filed on Apr. 2, 1997.

(30) Foreign Application Priority Data

Apr. 2, 1996 (GB) .............................................. 9606927

(51) Int. Cl.⁷ .............................................. G06F 12/00
(52) U.S. Cl. ........................ 711/113; 711/171; 710/68
(58) Field of Search ........................... 710/68; 711/113, 711/171

(56) References Cited

U.S. PATENT DOCUMENTS

| | | | |
|---|---|---|---|
| 4,467,421 A | 8/1984 | White | 711/118 |
| 5,247,638 A * | 9/1993 | O'Brien et al. | 710/68 |
| 5,247,646 A | 9/1993 | Osterlund et al. | 710/68 |
| 5,652,857 A * | 7/1997 | Shimoi et al. | 711/113 |
| 6,000,009 A * | 12/1999 | Brady | 711/112 |

FOREIGN PATENT DOCUMENTS

| | | |
|---|---|---|
| EP | 0682306 A2 | 11/1995 |
| WO | 91/20025 | 12/1991 |
| WO | 91/20076 | 12/1991 |

OTHER PUBLICATIONS

White, Ron; "How Computers Work", Ziff–Davis Press, 1994, pp. 56–61.*

* cited by examiner

*Primary Examiner*—Reginald G. Bragdon
(74) *Attorney, Agent, or Firm*—Pillsbury Winthrop LLP (57) ABSTRACT

A data system comprising a store (10), a memory (12), a user interface (32) and a memory controller (24) where the memory is used to buffer all data transferred between the user interface and the store, the system being characterized in that the memory controller copies data directly between the store and the memory, whereas the memory controller re-organizes data when the data is transferred between the memory and the user interface.

22 Claims, 8 Drawing Sheets

DATA STORAGE SYSTEM STORING DATA OF VARYING BLOCK SIZE

This is a continuation International Appln. No. PCT/GB97/00935 filed Apr. 2, 1997 which designated the U.S.

This invention relates to data storage devices. It finds particular application in a system which can store data in varying block sizes as may result from the use of data conversion or compression techniques.

BACKGROUND OF THE INVENTION

Data compression techniques can provide two main benefits to data storage systems. The effective capacity of a data storage device can be increased beyond its physical capacity because the volume of data to be stored in the device is less than the logical volume of data transferred in and out of the storage system. The data transfer time in and out of the storage device is effectively reduced by this decrease in the physical volume of data. This is of particular benefit where operation of the storage device is relatively slow for example in a magnetic disk.

PCT Patent Application No. 91/20076 (Storage Technology Corporation) shows the use of dynamically-mapped virtual memory system to permit the storage of data so that each data record occupies only physical space required for the data. A compaction algorithm using a multipath storage director, compresses data prior to storage. Null fields are listed in the virtual memory map and not stored on the physical medium.

PCT Patent Application No. 91/20025 (Storage Technology Corporation) shows a dynamically-mapped virtual memory system in which deleted dataset space is immediately released for re-use. The data storage subsystem receives an indication that the data file is being scratched from the virtual VTOC. Additional data security is provided by preventing unauthorised access to the data of scratched storage files, both in cache and on the storage devices.

European Patent Application No. 0 682306 (IBM) shows a log-structured file system which compares the size of blocks of data with the space available for their storage to determine the most efficient positioning arrangement. It has separate buffers for compressed and uncompressed data and a controller which selectively writes the fewer number of bytes to the disc.

U.S. Pat. No. 4,467,421 (Storage Technology) shows a virtual storage system which is interposed between a host CPU and (disc drive) storage devices to permit the storage medium to mimic a tape drive and write the data in a contiguous manner. The system may be applied to a mixed-mode storage system the components of which have different response times. such a solid state RAM, CCD memory, disc drives and tape.

In many data storage devices such as magnetic disks optical disks and magnetic tapes data is stored in units of fixed size called data blocks. A common size of data block is 512 bytes. The address that a host gives to a block of data is called the logical block address, whereas the address of the memory area that actually stores the data block is called the physical block. The logical block addresses and the physical block addresses are normally in the same order (that is, consecutive logical block addresses usually correspond to successive physical block addresses) but the physical address space may not be continuous. The discontinuities may arise because of the physical characteristics of the storage medium, for example certain blocks in the physical address may be unusable because of the presence of defects. The logical address of a block of data may be translated to a physical address by using an algorithm or by using a lookup table to define discontinuities in the physical ordering of blocks.

However, when data compression is used the data size after compression may not be constant for each logical block because some data is more compressible than other data. Thus the amount of data resulting from compression of each logical block will be variable.

The amount of data that results from compression of a logical block depends on the nature of the data and the compression technique used. The physical size of a block of compressed data may also change when the data is read, modified and rewritten. There is therefore considerable difficulty in incorporating data compression within the immediate control structure of a random block access storage device such as a magnetic disk because of the problem of managing the variable amounts of data which result from compression of the fixed logical blocks of data.

BRIEF SUMMARY OF INVENTION

The invention therefore provides a data storage system comprising: a store, a memory a user interface, and a memory controller, where the memory is used to buffer all data transferred between the user interface and the store, the system being characterised in that the memory controller copies data directly between the store and the memory, whereas the memory controller re-organises data when the data is transferred between the memory and the user interface.

The memory may have a capacity identical to a region of the store, where the region is a part of the store that can be conveniently accessed in a single operation in accordance with the accessing mechanisms of the store.

Data may be transferred to and from the store in units of the full capacity of the memory.

The data storage system may comprise several stores, each of which may perform data transfers to or from the memory.

The data storage system may comprise several memories, each of which may be loaded with data from an independent region of a store.

Data transfers from a store to a memory may be scheduled to provide the highest possible probability of a data block which is required for a transaction at the user interface being resident in a memory.

The store may be a magnetic disk.

The memory may be a random access semiconductor memory.

Data compression and decompression may be incorporated between the memory and the user interface.

A region of the store may contain a predetermined number of logically contiguous data blocks which are permanently resident in the region, and as many non-contiguous data blocks as may conveniently be accommodated in the available physical storage space of the region.

The non-contiguous data blocks may be relocated from a first region to a second region to create physical storage space if one or more of the logically contiguous data blocks which are permanently resident in the first region increases in size.

The non-contiguous data blocks may be relocated from a first region to a second region to fill physical storage space which results from a change in the physical size of one or more of the logically contiguous data blocks which are permanently resident in the second region.

Relocation of a non-contiguous data block between regions may be accomplished by transfer of the block from one memory to another memory.

A memory may be designated as the source or destination of all data blocks to be relocated between regions.

The memory controller may ensure that the memory is loaded with data from such a region of the store as will provide sufficient free physical memory space for relocation of a data block.

The logical page address of the predetermined number of logically contiguous data blocks which are permanently resident in a region may have a direct correspondence with the sequential address of the region within the store.

The logical address of an independent data block which is not permanently resident in a region may be translated to a logical address within a region by means of a lookup table.

The memory may be independently addressable in tiles which comprise a fixed number of data words.

Each logical block of data may be stored in a chain of linked groups of tiles.

The sizes and number of groups in each chain may be selected in accordance with the size of the block of data.

An address may be stored for each logical block of data identifying the physical address within the memory of the first group of tiles of the block.

Any unused groups of tiles in the memory may be linked together in a number of free space chains.

A battery may be provided to maintain a source of electrical power for sufficient time to allow transfer of all data from the memory to the store in the event of failure of a primary power supply.

Arrangements for management of the storage of data with variable block size. such as may result from data compression, have been devised. One of these arrangements treats a block of data as an indivisible unit and manages the fragmentation of free memory by means of relocation and reordering of blocks of data within the memory. This requires rewriting of the data blocks to different locations and the updating of a lookup table which maps logical to physical addresses.

One disadvantage of this arrangement is that repeated relocation of a data block can increase the chances of data being corrupted. The relocation is necessary. however, because a block of data has to be stored in a physically continuous area of physical memory. The arrangement requires fast access to the entire memory to perform the relocation of data and is most appropriate to large semiconductor memories such as solid state disks. The fast random data access operations which it requires are not compatible with magnetic disk memories.

Another arrangement for storing data with variable block size uses distributed storage of a block of data. The data block is subdivided into discrete segments which are stored at different locations in the physical memory. A memory is organised into a plurality of groups of tiles where a tile is a basic unit of memory and contains a fixed number of data words. There are a plurality of different group sizes and each group size contains a different number of tiles. When a data block is stored it is split up into a selection of the groups of tiles so as to minimise the wastage of storage space arising from partial use of a group of tiles. The discrete segments used for storage of a data block are linked together by link pointers stored in a group header associated with each segment or group. The physical location of the first segment used for storage of a block of data is stored separately, but preferably on the same medium, and can be used to compile a look up table of logical to physical block addresses. The arrangement can preformat the memory, into discrete segments having a plurality of predetermined sizes which can then be linked together to ensure that the minimum amount of storage space required for a block is used. To manage free data space, the segments not used for storage are linked via their group headers thereby giving a chain of segments of free memory. The arrangement requires multiple random accesses to the memory device for each block access and so is most effective when used with high speed semiconductor memory. It is particularly suitable for use in solid state disk memories. One disadvantage, however, is that it is not appropriate for use directly with memory devices such as magnetic disks which cannot provide fast random access.

The two arrangements described immediately above for management of the storage of data with variable block size rely on the principles of partitioning of a data block to locate it efficiently in a storage medium and relocation of a data block to compensate for any change in size of the stored data blocks. Both principles demand multiple random accesses to the storage medium for data block read and write operations and hence can only provide a high performance data storage system if fast memory is used for the storage device. The methods are intended primarily for solid state disk systems employing random access semiconductor memory. It is difficult to adopt these methods with a storage device such as magnetic disk because random access is on a magnetic disk is a mechanical operation and is relatively slow.

BRIEF DESCRIPTION OF DRAWINGS

For a better understanding of the present invention and to show how it may be carried into effect, reference will now be made by way of example to the accompanying drawings in which.

DETAILED DESCRIPTION OF INVENTION

When data compression techniques are applied to a block of data, the compression which is achieved and hence the compressed block size vary widely as a function of the characteristics of the data. Some types of data such as binary object code contain very little redundancy and are only marginally compressible whilst other forms such as image data may be compressed to less than one tenth of their original volume. Therefore, although block sizes before compression are of a fixed size block sizes in a data storage system after data compression may vary over a very wide range. An efficient storage management arrangement must be able to cope with the dynamic nature of the block size distribution.

Figure 1:
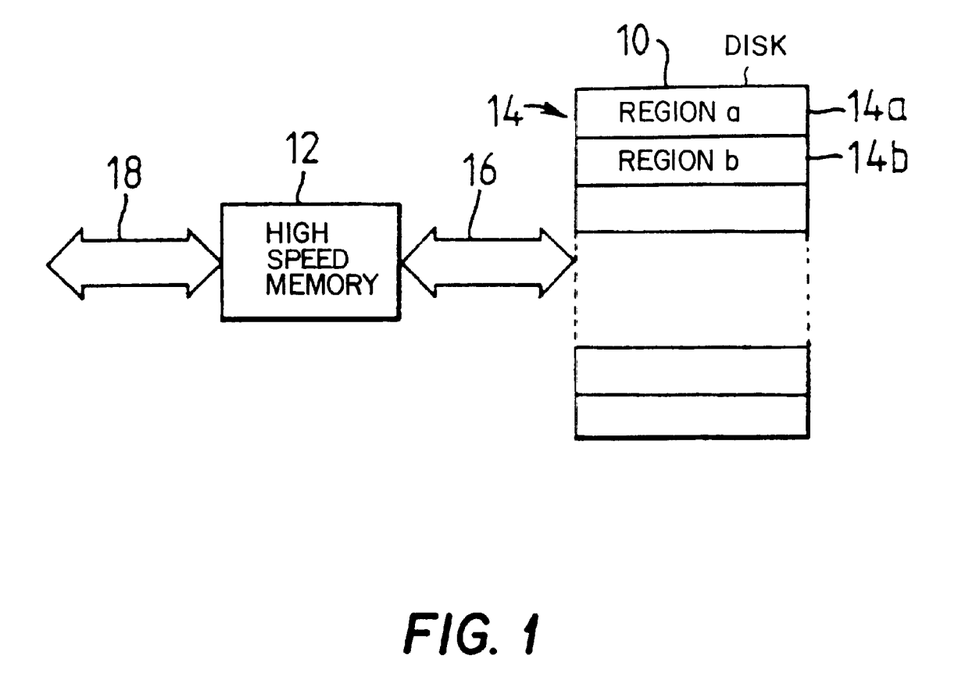
FIG. 1 shows schematically the use of a high speed memory to buffer data accesses to a region of a store.

FIG. 1 shows a basic data storage system. It has a store which in this embodiment is a magnetic disk drive 10 connected to a high speed memory 12 which acts as a buffer for all data input/output operations to the magnetic disk drive 10. The system of FIG. 1 shows the principles of partitioning and relocation required for management of variable lock size data resulting from data conversion such as data compression. The magnetic disk drive 10 is partitioned into regions 14 which are of fixed physical size and are sequentially addressed within the magnetic disk drive 10. A region 14 is a natural subdivision of the magnetic disk drive 10 according to its accessing mechanisms. Data may be written to or read from a region 14 in a single access operation of the disk drive 10. For example, a region 14 may be a track or cylinder of the magnetic disk 10 or array of magnetic disks. The disk drive 10 comprises a plurality of regions 14 which may be independently accessed through a data port 16 connecting the magnetic disk drive 10 with a high speed memory 12. The high speed memory 12 connects to the data port 16 and buffers all data which is transferred in or out of the disk drive 10. The high speed memory 12 is arranged to have a memory capacity equal to that of a region 14 of the disk drive 10. Data is transferred between the high speed memory 12 and a region 14 such that the entire data contents of the high speed memory 12 and region 14 are transferred via the data port 16 in a single operation. Such data transfers occur as a direct bit copy between the high speed memory 12 and region 14.

Data is written to and read from the data storage system via a data input/output channel 18 which connects to the high speed memory device 12. Data may be reorganised between the high speed memory 14 and the input/output channel 18. For example, data compression and decompression may be incorporated at the input/output channel. Data is normally transferred at the input/output channel 18 in units of a data block or a sequence of data blocks such that the volume of data transferred in an input/output operation is considerably less than the capacity of the high speed memory 12.

Figure 2:
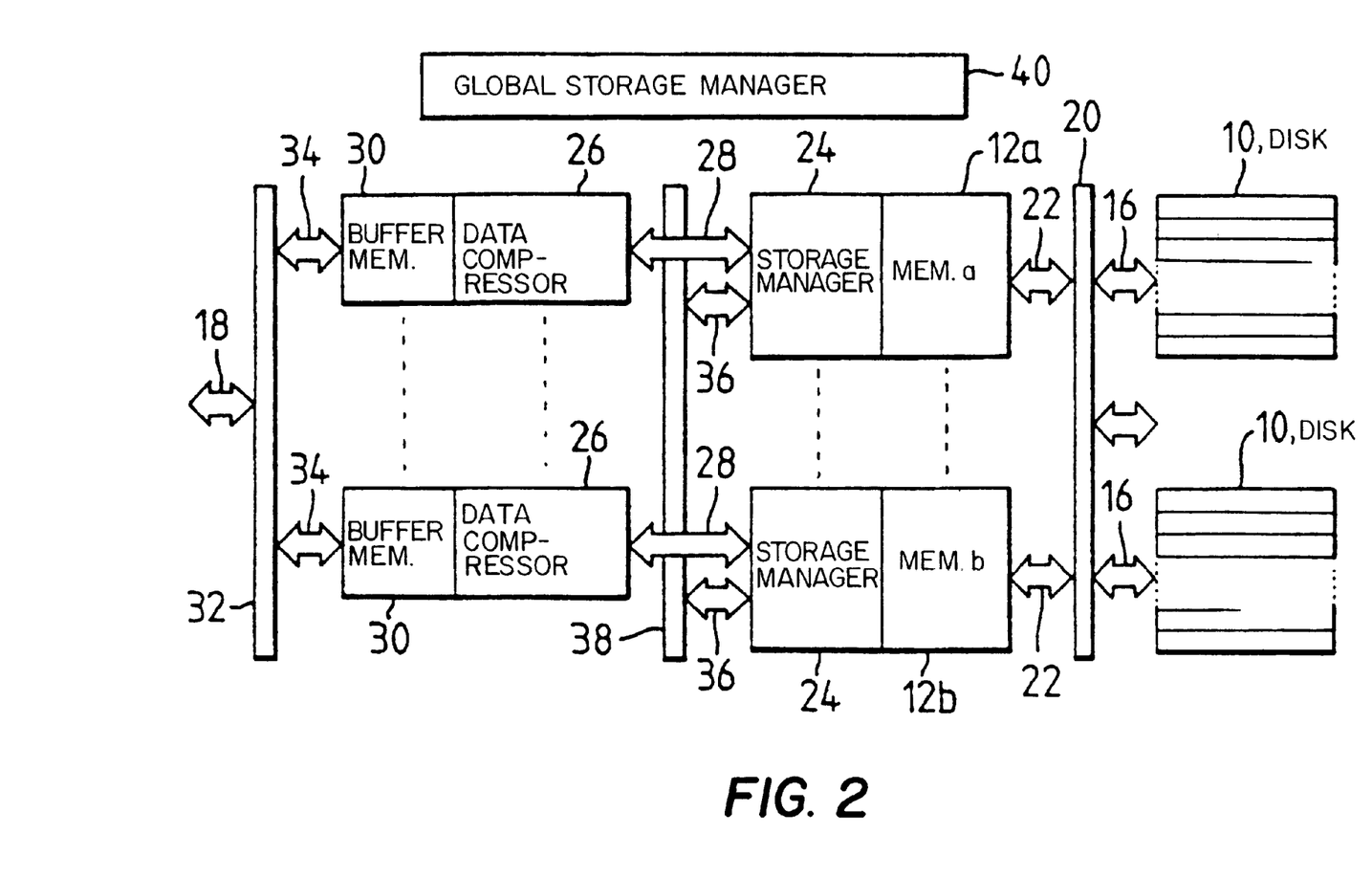
FIG. 2 shows a system employing the Regional Buffer Architecture.

FIG. 2 shows a data storage system incorporating a plurality of high speed memories 12, a corresponding number of stores 10, and management functions. The stores 10 in this embodiment are magnetic disks but in other embodiments they may be other forms of mass storage device such as optical disks or magnetic tapes. Each disk drive 10 connects via a data port 16 to a regional bus 20 through which data from any region 14 on any store 10 may be accessed. The regional bus 20 is also connected via memory ports 22 to a plurality of high speed memories 12. Each high speed memory 12 may independently transfer data to and from any region 14 on any store 10, subject only to multiplexing constraints of any data transfer arrangement used on the regional bus 20. Each high speed memory 12 is controlled by a memory storage manager 24. A data compressor 26 is incorporated between a compressor port 28 to each high speed memory 12 and the input/output channel 18 to the data storage system.

A logical block of data (data block) of fixed size is transferred from the input/output channel 18 to a block buffer memory 30 via interface bus 32 and an interface port 34. This data block is then passed through the data compressor 26 under control of the memory storage manager 24 and the resulting variably sized block is written to the high speed memory 12. The inverse sequence of operations applies for transfer of a data block from a high speed memory 12 to the input/output channel 18. The interface bus 32 allows a data block to be transferred between any high speed memory 12 and the data input/output channel 18, subject only to multiplexing constraints of any data transfer arrangement used. Data may also be transferred directly between two high speed memories 12 by means of internal copy ports 36 and internal copy bus 38. A memory storage manager 24 controls the organisation and storage of data in a high speed memory 12, controls data flow through the data compressor 26, controls data transfers in and out of a high speed memory 12 and performs logical to physical address translation for data within a region 14. A global storage manager 40 controls operations on the input/output channel 18, implements disk caching algorithms, schedules and controls data transfers to and from regions 14 on a mass storage device, schedules relocation of blocks between regions 14 and performs logical to physical region 14 address translation for data blocks.

The system shown in FIG. 2 provides a high performance data storage system based on magnetic disks through the use of high speed memories 12 as high speed disk cache memory. It is known that use of a cache memory can provide a fast data storage system if data transfers between the high speed cache memory and the disk memory are scheduled to provide a high probability of data required for input/output being resident in the cache memory. The high speed memory 12 achieves very fast cache operation because only compressed data is transferred between the magnetic disk 10 and the high speed memories 12. Thus data transfer times can be minimise. A high logical storage capacity is produced by compression of all stored data.

Figure 3:
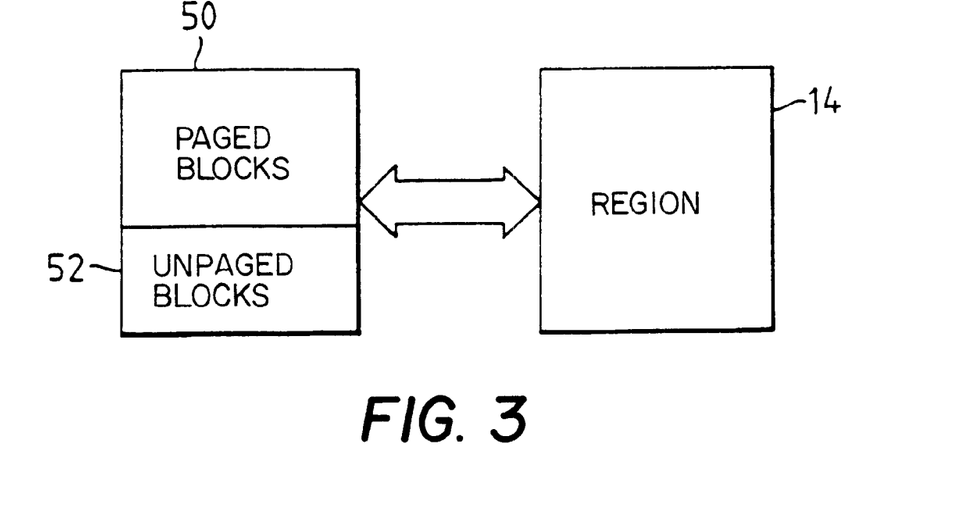
FIG. 3 shows logical to physical mapping for regional storage management.

FIG. 3 shows the correlation between the organisation of uncompressed logical data blocks and the physical storage space within a high speed memory 12 and hence within a region 14 of the magnetic store 10. Each region 14 contains a fixed number m of logically contiguous data blocks, designated as a page 50, which are permanently resident in the region 14. The logical page number within the data storage system is arranged to be identical to the sequential region number within the magnetic disks 10 so that there is a direct correspondence between logical page address and logical region address. The number m of data blocks in a page 50 is preferably a binary power so that address decoding remains simple. The physical memory capacity of a region 14 is large enough to accommodate one logical page 50 when only the minimum compression of the data is achieved.

There will usually be surplus physical memory capacity after storage of a logical page 50 and this can be occupied by a number b of independent unpaged non-contiguous data blocks (unpaged blocks 52). The number b is variable as a function of the compression ratio achieved on the data within a region 14.

The variable sized logical blocks are partitioned and distributed to efficiently pack into the physical region 14. If additional physical space within a region 14a is required to accommodate an increase in size of a paged block 50, an unpaged block 52 can be relocated to another region 14b. This can be accomplished by a data transfer directly between high speed memories 12 in the architecture of FIG. 2.

Figure 4:
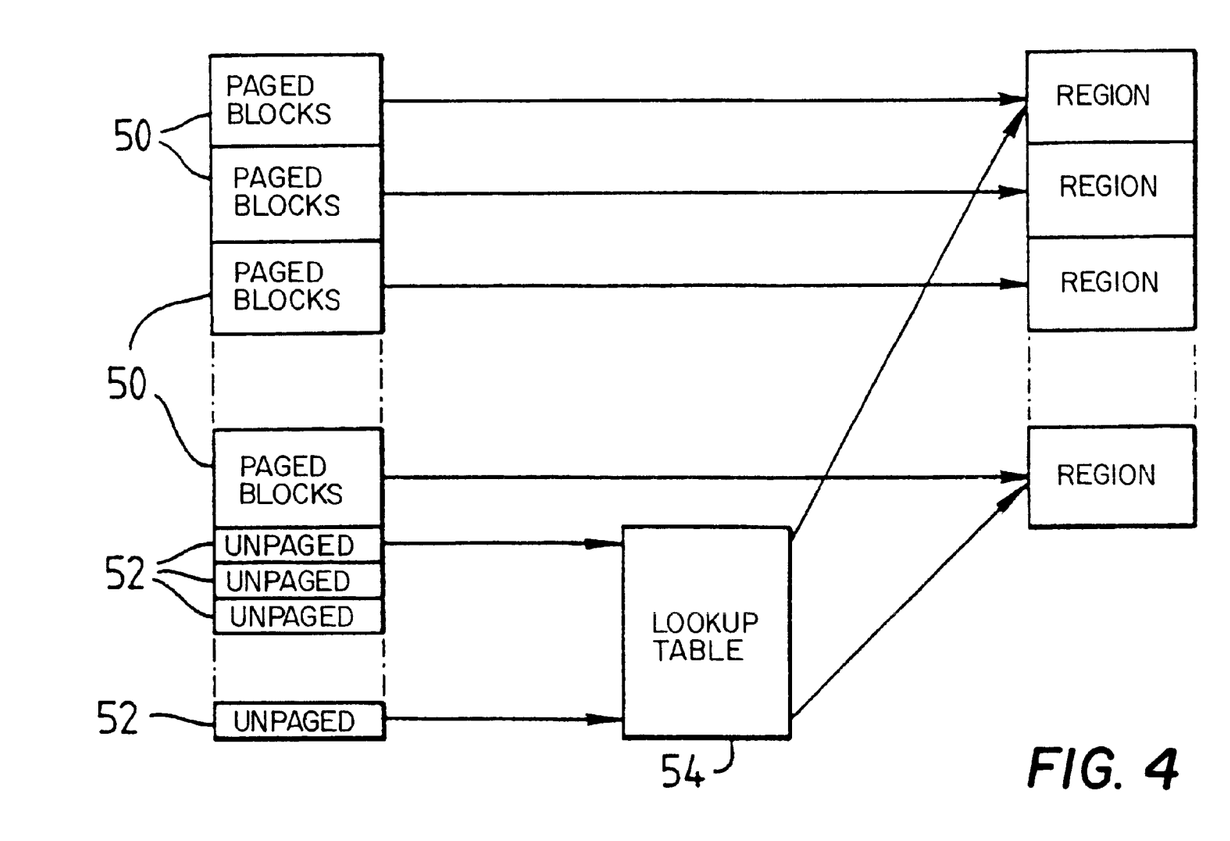
FIG. 4 shows logical to physical mapping for global storage management.

FIG. 4 shows the correlation between logical block number and the organisation of the physical storage space within the data storage system. Logical blocks are organised two distinct series. The first series has n pages 50 of m blocks each, and each page 50 is stored in the region 14 with the corresponding logical number. No address translation for pages 50 is therefore required. The second series is composed of k unpaged blocks 52. These k unpaged blocks 52 are stored without paging. The value of k depends on the memory space available after storage of the paged blocks 50. An unpaged block 52 may be located in any region 14 within the physical memory space and may also be relocated from one region 14a to another region 14b to accommodate changes in size of the paged blocks 52 in a region 14a.

A lookup table 54 is used to translate the logical block number for unpaged blocks 52 to the logical region number where it is located. The lookup table 54 may be stored in a special area of fast memory. The contents of the fast memory (the look up table) is copied to a corresponding area of the magnetic disk 10 in a similar manner to the transfer of the contents of a high speed memory 12 to a region 14.

The relocation of an unpaged block 52 between regions 14 is accomplished by transfer of the unpaged block 52 from one high speed memory 12a to another high speed memory 12b via internal copy bus 38. One high speed memory 12b may be assigned to hold a region 14 with free physical memory area and may be designated as the source or destination of all block relocations. In this way, a block relocation between regions 14 does not require access to the magnetic disk drive.

When no free memory space exists in any region 14 of the magnetic disk 10, the storage system has reached full capacity. No additional data blocks may be written. Modification of an existing data block may not be possible until free space is created by deletion of data blocks.

Figure 5:
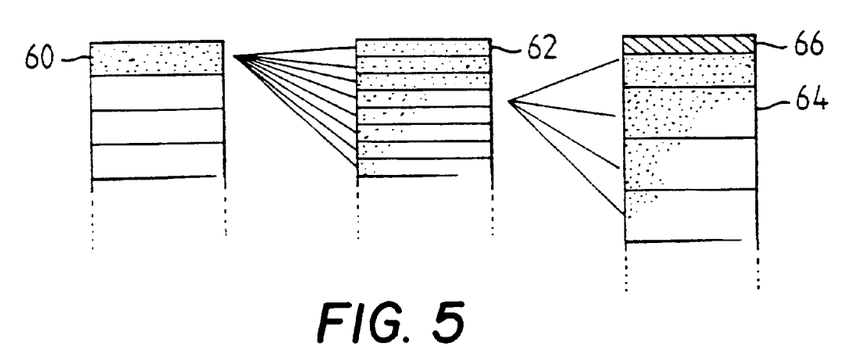
FIG. 5 shows the memory structures within a regional buffer.

FIG. 5 shows the memory structures which exist in a high speed memory 12. Data blocks and free memory space within a high speed memory 12 and a region 14 are organised in accordance with the arrangement for distributed storage of a block described earlier in this patent application. A word 60 is the minimum addressable unit of physical memory and will have a word length determined by the structure of the memory device. It may topically be 16 or 32 bits long. A tile 62 is a fixed number of contiguous words 60 in memory. It is the basic unit of memory space addressing and hence is the minimum increment in size of a stored block of data. A tile 62 may typically be eight or sixteen words 60. A group 64 is a set of contiguous tiles 62 in memory and may be any size with a minimum size of one tile 62 but will typically comprise 1, 2, 4 or 8 tiles 62. A group 64 includes a predetermined number of memory locations allocated as a group header 66.

Figure 6:
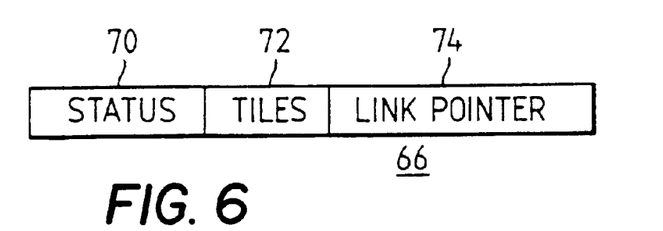
FIG. 6 shows the format of a group header which is associated with each group memory structure within a regional buffer.

FIG. 6 shows the format of a typical group header 66. The group header 66 contains three fields: a status field 70, a tiles field 72, and a link pointer 74. The status field 70 defines whether the group 64 is part of a data block or part of free space within a region 14 and whether the group 64a is linked to a following group 64b. The tiles field 72 contains information about the number of tiles 62 in the group 64. The link pointer 74 defines the address of the start of another group 64b to which the group 64a is linked. The address is defined in increments of one tile 62 relative to the start address of the high speed memory 12.

Figure 7:
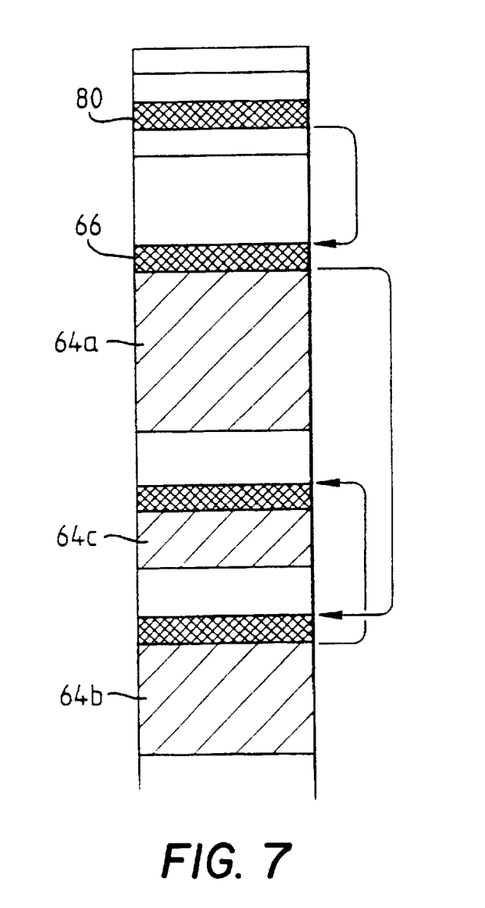
FIG. 7 shows a data block structure within a regional buffer.

FIG. 7 shows how the link pointer field 74 in the group header 66 allows groups 64a,b,c to be linked to form a larger data block. The data block may comprise groups 64 which can be linked in any physical order. A physical address pointer 80 to the group header 66 of the first group 64a of the block is situated at a location in the high speed memory 12 which is defined by the logical address of the block within the region 14. Thus for the region 14 of FIG. 3 which contains m+b logical blocks, the first m+b locations of the high speed memory 12 contain the physical start addresses for the data blocks.

The data block in FIG. 7 is eleven tiles 62 in length and it comprises groups of eight tiles 64a, two tiles 64b, and one tile 64c. linked in a chain by means of the information in the group headers 66. The constituent groups 64a,b,c can be located anywhere within the physical memory space of the high speed memory 12.

Data blocks of any length can be accommodated with this arrangement but the availability of groups of size 8, 4, 2, and 1 tiles gives maximum efficiency for block sizes of up to 15 tiles. When a data block is to be written to a high speed memory 12, the data block is partitioned into one or more segments of size equal to the available group sizes. The data along with the appropriate group header information 66 is written at the location of groups which currently exist as free space and are not assigned to another data block. The last group header 64c in a linked chain contains the block logical address in the link pointer field 74 to provide data security and the ability to recover linking information in the event of corruption of any pointer or header 66.

Figure 8:
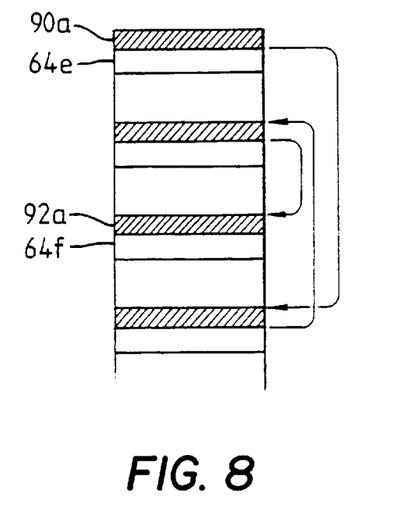
FIG. 8 shows the free space structure within a regional buffer.

A similar chain of linked groups 64 may be employed to manage the free space in high speed memory 12, as shown in FIG. 8. Separate free space chains 90 may be maintained for each group size. A start pointer 92a is used to define the address of the header of the first group 64e and an end pointer 94a is used to define the address of the last group 64f in each chain. These pointers 92, 94 are modified when groups 64 are appended to or removed from the free space chain. The pointers 92, 94 defining the free space chains 90 can be stored at reserved locations in the high speed memory 12 in the same way as the block physical address pointer 80.

After the data storage system is first initialised, each region 14 should be formatted into group sizes of 1, 2, 4, and 8 tiles 62 and free space chains 90 should be formed together with their associated pointers 92, 94. This formatting may be identical for every region 14 in the magnetic disk 10 since all regions 14 and high speed memories 12 may be the same size. The formatting can be easily achieved by loading a standard pattern of free space chain pointers 92, 94 and linked group headers 66 into a high speed memory 12 before data is written to the high speed memory 12 for a final destination in a previously empty region 14 of the magnetic disk 10. Thus the magnetic disk 10, does not require any specific formatting after initialisation for use with the present invention other than that which is conventionally performed on magnetic disks.

A data block read operation is performed as follows. If the data block is already resident in a high speed memory 12, the read operation begins immediately. Otherwise, data for the complete region 14 of the magnetic disk 10 in which the block is located must be loaded into a high speed memory 12. Caching algorithms for magnetic disks are well known for transfer of data to a high speed cache memory in advance of the data being requested at an input/output channel 18 to ensure the highest probability of immediate availability of the data.

The logical address of the data block within the region 14 is supplied to the memory storage manager 24 by the global storage manager 40. A physical address pointer 80 is read from the location in the high speed memory 12 defined by the block logical address and a group 64 is read from the location defined by this physical address pointer 80. The group header 66 is stored to provide a physical address for any subsequent group. Linked groups are read in this way under hardware control until the last group of the block is reached.

A data block write operation is performed as follows. Data for the region to which the block is to be written must be resident in a high speed memory 12 before the operation can commence in the same way as for a data read operation. A control processor within the memory storage manager 24 partitions the data block and allocates groups 64 from appropriate free space chains 90. The control processor then loads all necessary pointers, headers and address information for constituent groups 64 to the memory storage manager 24, and an address pointer and data groups are written at the pre-defined locations in the high speed memory 12 under control of the memory storage manager 24. Obsolete groups relating to the logical block are appended to the end of the appropriate free space chains 90 and the free space pointers 92, 94 are updated. Data need only be loaded to a region 14 on the magnetic disk 10 from the high speed memory 12 when it is necessary to load data from a different region 14 into the high speed memory 12 or after a predetermined length of time.

The memory storage manager 24 controls the organisation and storage of data in the high speed memory 12, controls data flow through the data compressor 26. controls data transfers in and out of the high speed memory 12, and performs logical to physical address translation for data within a region 14.

Figure 9:
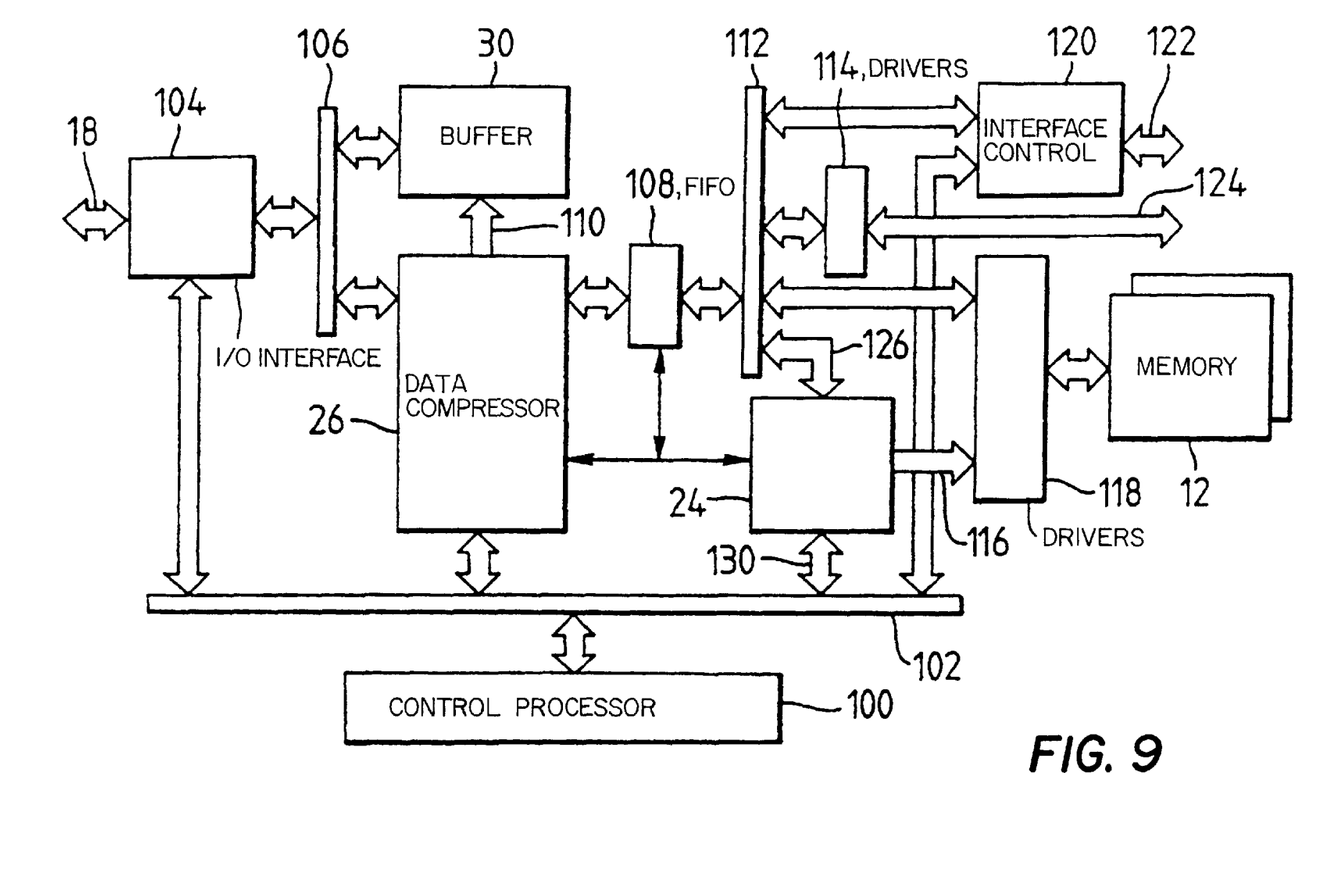
FIG. 9 shows an arrangement for control of regional storage in an embodiment of the invention.

FIG. 9 shows a block diagram of the regional control function including a memory storage manager and data compressor. A regional control processor 100 performs data transfer scheduling and address control functions and communicates with other control elements via transfer bus 102. A single regional control processor 100 may communicate with and control a plurality of memory storage managers 24.

When a data block is to be written to the high speed memory 12, the global storage manager 40 informs the regional control processor 100 that the block is ready for transfer at the input/output channel 18 and provide information about the logical address of the block within the region 14. The operation may also be performed on a plurality of sequential data blocks. The regional control processor 100 loads control information via transfer bus 102 to an input/output interface 104 and a data compressor 26. The data compressor 26 may be an application specific integrated circuit (ASIC). The data block is then transferred via input/output interface 104 and interface data bus 106 to a block buffer 30. This block buffer 30 may be a static random access memory (SRAM).

The data block resident in the block buffer 30 is uncompressed and has a fixed size. The block buffer 30 may have a capacity sufficient to accommodate a plurality of data blocks. The data block is then transferred through the data compressor 26 to a first-in-first-out memory 108. All data transfers in and out of the block buffer 30 are controlled by the data compressor 26 via compressor bus 110. Data transfers in and out of the block buffer 30 may be concurrent if a time division multiplex arrangement is used on the interface bus 106. The data compressor 26 may implement any data compression arrangement which reduces the size of a data block.

The regional control processor 100 is informed by the data compressor 26 of the size of the data block which is resident in the first-in-first-out memory (FIFO) 108. The regional control processor 100 then partitions the block into segments and allocates segments to groups 64 which are available in free space chains 90 in the high speed memory 12. Group header address and data information, and control codes are loaded by the regional control processor 100 into memory storage manager 24. Data is transferred under control of the memory storage manager 24 from the FIFO 108 via a FIFO bus 112 and drivers 114 to the high speed memory 12. The memory storage manager block 24 may be an application specific integrated circuit (ASIC). During the writing of data to the high speed memory 12, the memory storage manager 24 inserts data for group headers 66 via FIFO bus 112 and controls the address for all accesses of the high speed memory 12 via a management bus 116.

The operation of reading a block of data from a high speed memory 12 and transferring it to the input/output channel 18 follows a similar pattern in the reverse direction.

Transfer of data between the high speed memory 12 and a region 14 on the magnetic disk 10 which acts as a mass storage device is implemented via memory drivers 118, FIFO bus 112, disk interface control 120 and disk interface port 122. The entire data contents of the high speed memory 12 are transferred in a single operation and cycling of the high speed memory's 12 addresses is performed by memory storage manager 24. Disk interface control 120 performs all control functions necessary for accessing a magnetic disk 10 and synchronises data transfers to be compatible with the magnetic disk 10. In other embodiments where a store other than a magnetic disk is used the disk interface control 120 would be replaced with a controller dedicated to the particular store used. Control parameters for the transfer are loaded to the memory storage manager 24 and the disk interface 120 by the regional control processor 100.

Transfer of data between two high speed memories 12 is accomplished via memory drivers 118, FIFO bus 112, drivers 114 and region interface port 124, and the corresponding elements in the regional control structure for the second high speed memory 12. Data transfers via this route would normally be for relocation of a single unpaged data block 52 or a small set of unpaged data blocks 52.

Figure 10:
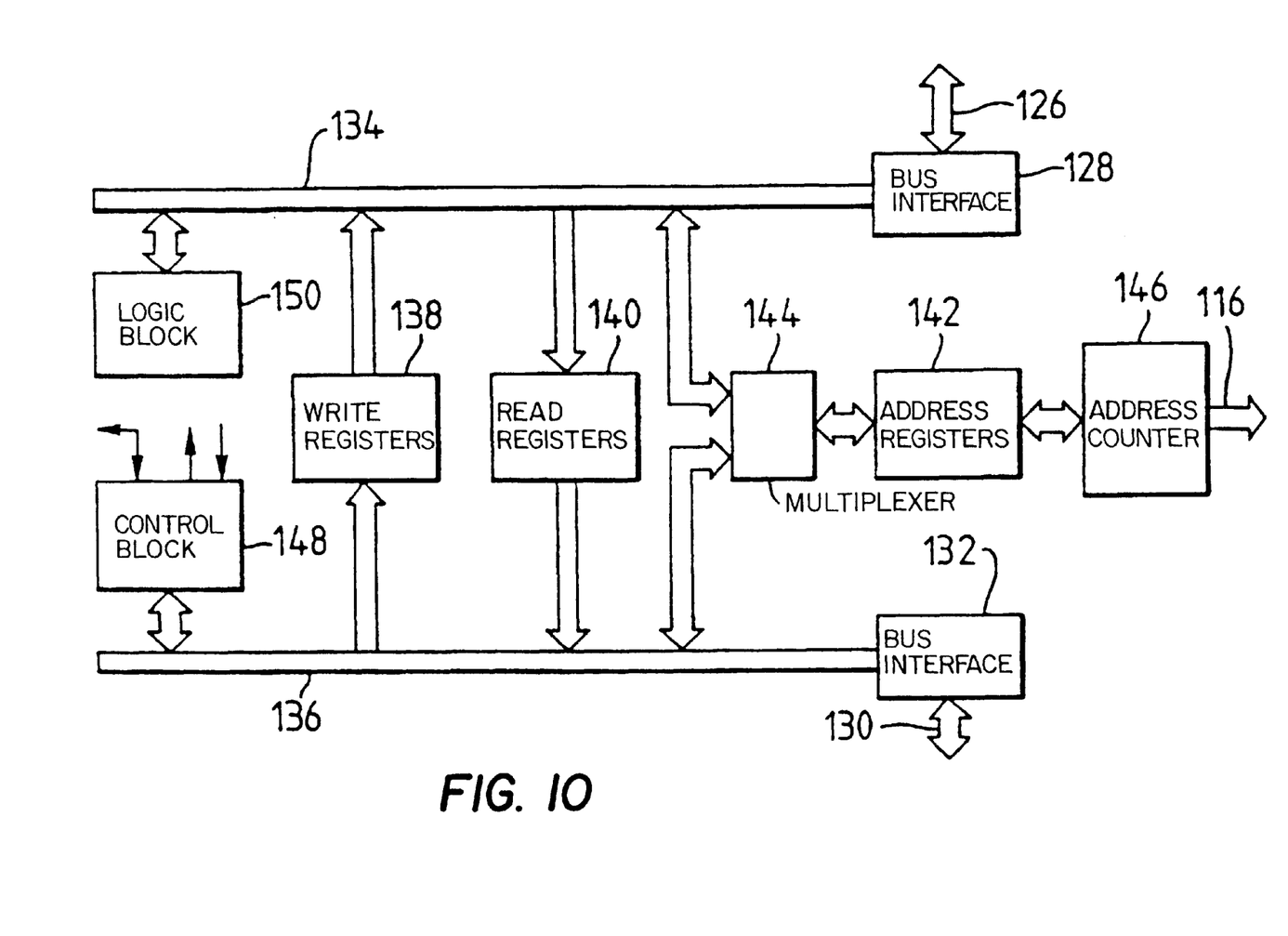
FIG. 10 shows an arrangement for control of the regional buffer memory in a system embodying the invention.

FIG. 10 shows the structure of the memory storage manager 24. Storage manager port 126 provides communication between the memory storage manager 24 and FIFO bus 112 via a FIFO bus interface 128. Transfer port 130 provides communication between the memory storage manager 24 and the transfer bus 102, via a transfer bus interface 132.

Internal to the memory storage manager 24, internal data bus 134 acts as a data bus and internal processor bus 136 acts as a processor bus. Management bus 116 supplies address and control signals for the high speed memory 12. The header write registers 138 comprise a bank of registers into which one or more group headers 66 are loaded by the regional control processor 100 to be written as group headers 66 via the internal data bus 134. The header read registers 140 comprise a bank of registers in which one or more group headers 66 extracted from data on the internal data bus 134 are stored for subsequent reading by the regional control processor 100. The address registers 142 comprise a bank of registers into which one or more addresses are loaded, either from the internal processor bus 136 or from the internal data bus 134. A multiplexer 144 controls the source for address register loading. An address from the address register 142 is loaded into an address counter 146 to define the starting point for a memory access. If the memory access comprises a string of sequential word addresses as in a group read or write operation, the address counter 146 generates the address sequence. Control block 148 generates the control signals for all operations under the direction of the regional control processor 100.

ECC logic block 150 generates and checks an error checking code (ECC) which may be appended to each group 64 or data block.

What is claimed is:

1. A data storage system comprising:
    a store, a plurality of buffer memories, a user interface, and a memory controller,
    wherein a first region of the store contains a predetermined number of logically contiguous data blocks which are permanently resident in the region, and as many logically non-contiguous data blocks as can be accommodated in the remaining physical storage space of the first region, and
    wherein the plurality of buffer memories buffer all data transferred between the user interface and the store, and
    wherein the memory controller copies data directly for transfers between the store and the memories, re-organises data when the data is transferred between the memories and the user interface, and relocates at least one of the non-contiguous data blocks from the first region to a second region of the store, so as to create available physical storage space in the first region, if one or more of the logically contiguous data blocks in the first region increases in size, and
    wherein relocation of a non-contiguous data block between regions is accomplished by transfer of the data block from one buffer memory to another buffer memory.

2. A data storage system according to claim 1, wherein the memory controller compresses or decompresses data which is transferred between the memories and the user interface.

3. A data storage system according to claim 1, wherein the store is divided into equal-sized regions, which include the first and second regions, and each region is independently accessible by the controller in a single operation and each buffer memory has a capacity identical to a region of the store.

4. A data storage system according to claim 1, wherein the controller transfers data to and from the store in units of full capacity of each buffer memory.

5. A data storage system according to claim 1, wherein the data storage system comprises a plurality of stores, each of which performs data transfers to or from a buffer memory.

6. A data storage system according to claim 1, wherein each buffer memory is loaded with data from a separate region of the store.

7. A data storage system, according to claim 1, wherein the non-contiguous data blocks are relocatable from the first region to the second region to fill available physical storage space in the second region which results from a change in the physical size of one or more logically contiguous data blocks which are permanently resident in the second region.

8. A data storage system comprising:
    a store, a buffer memory, a user interface, and a memory controller,
    wherein a first region of the store contains a predetermined number of logically contiguous data blocks which are permanently resident in the region, and as many logically non-contiguous data blocks as can be accommodated in the remaining physical storage space of the first region, and
    wherein the buffer memory buffers all data transferred between the user interface and the store, and
    wherein the memory controller copies data directly for transfers between the store and the memory, re-organises data when the data is transferred between the memory and the user interface, and relocates at least one of the non-contiguous data blocks from the first region to a second region of the store, so as to create available physical storage space in the first region, if one or more of the logically contiguous data blocks in the first region increases in size, and
    wherein a buffer memory is designated as a source or destination of all data blocks to be re-located between regions of the store.

9. A data storage system as claimed in claim 8, wherein the memory controller compresses or decompresses data which is transferred between the memory and the user interface.

10. A data storage system as claimed in claim 8, wherein the store is divided into equal-sized regions, which include the first and second regions, and each region is independently accessible by the controller in a single operation and the buffer memory has a capacity identical to a region of the store.

11. A data storage system as claimed in claim 8, wherein the controller transfers data to and from the store in units of full capacity of the buffer memory.

12. A data storage system as claimed in claim 8, wherein the data storage system comprises a plurality of stores, each of which performs data transfers to or from the buffer memory.

13. A data storage system as claimed in claim 8, wherein the data storage system includes a plurality of buffer memories, each of which is loaded with data from a separate region of the store.

14. A data storage system as claimed in claim 8, wherein the non-contiguous data blocks are relocatable from the first region to the-second region to fill available physical storage space in the second region which results from a change in the physical size of one or more logically contiguous data blocks which are permanently resident in the second region.

15. A data storage system comprising:
    a store, a buffer memory, a user interface, and a memory controller,
    wherein a first region of the store contains a predetermined number of logically contiguous data blocks which are permanently resident in the region, and as many logically non-contiguous data blocks can be accommodated in the remaining physical storage space of the first region, and
    wherein the buffer memory buffers all data transferred between the user interface and the store, and
    wherein the memory controller copies data directly for transfers between the store and the memory, re-organises data when the data is transferred between the memory and the user interface, and relocates at least one of the non-contiguous data blocks from the first region to a second region of the store, so as to create available physical storage space in the first region, if one or more of the logically contiguous data blocks in the first region increases in size, and
    wherein a logical page address of the predetermined number of logically contiguous data blocks which are permanently resident in the first region of the store has a direct correspondence with a sequential address of the first region of the store.

16. A data storage system as claimed in claim 15, wherein the memory controller compresses or decompresses data which is transferred between the memory and the user interface.

17. A data storage system as claimed in claim 15, wherein the store is divided into equal-sized regions, which include the first and second regions, and each region is independently accessible by the controller in a single operation and the buffer memory has a capacity identical to a region of the store.

18. A data storage system as claimed in claim 15, wherein the controller transfers data to and from the store in units of full capacity of the buffer memory.

19. A data storage system as claimed in claim 15, wherein the data storage system comprises a plurality of stores, each of which performs data transfers to or from the buffer memory.

20. A data storage system as claimed in claim 15, wherein the data storage system includes a plurality of buffer memories, each of which is loaded with data from a separate region of the store.

21. A data storage system as claimed in claim 15, wherein the non-contiguous data blocks are relocatable from the first region to the second region to fill available physical storage space in the second region which results from a change in the physical size of one or more logically contiguous data blocks which are permanently resident in the second region.

22. A data storage system comprising:

a store, a buffer memory, a user interface, and a memory controller, wherein a first region of the store contains a predetermined number of logically contiguous data blocks which are permanently resident in the region, and as many logically non-contiguous data blocks as can be accommodated in remaining physical storage space of the first region, wherein the buffer memory buffers all data transferred between the user interface and the store, wherein the memory controller copies data directly for transfers between the store and the memory and re-organizes data when the data is transferred between the memory and the user interface, and wherein a logical page address of the predetermined number of logically contiguous data blocks which are permanently resident in the first region of the store has a direct correspondence with a sequential address of the first region of the store.

* * * * *